Patented May 5, 1942

2,281,567

UNITED STATES PATENT OFFICE 2,281,567

COMPOSITION AND METHOD OF PREPARING SAME

Ellsworth K. Ellingboe and Paul L. Salzberg, Newcastle County, Del., assignors to E. I. du Pont de Nemours & Company, Wilmington, Del., a corporation of Delaware No Drawing. Application December 17, 1937, Serial No. 180,317

7 Claims. (Cl. 260—735)

This invention relates to compositions comprising a rubber hydrohalide and a polymeric basic amino-nitrogen-containing body which compositions are resistant to the deterioration caused by light and heat.

Rubber hydrohalides, for example, rubber hydrochloride which is prepared by the addition of hydrogen chloride to rubber by processes known to the art and which may contain 26 to 34% chlorine, are admirably suited for the preparation of transparent self-supporting films and wrapping materials which are highly durable, tear resistant, and water resistant. However, rubber hydrochloride rapidly becomes brittle, fragile and dark colored on aging particularly in the presence of light or at elevated temperature. It is believed that loss of hydrogen chloride from the rubber hydrochloride molecule, a loss which is accelerated by light and heat and also the presence of free hydrogen chloride in the film, is responsible for the deterioration of the film.

It has now been discovered that certain new basic polymeric amino-nitrogen-containing bodies, preferably those soluble in organic solvents, are especially effective for use in compositions containing rubber hydrochloride and may be advantageously used to render these compositions resistant to deterioration by the action of both light and heat.

Thus, it is an object of this invention to provide a new class of materials for increasing the resistance of rubber hydrochloride to the action of both light and heat, which materials because of their inherent film-forming properties do not detract from the film-forming characteristics of the compositions in which they are used. Another object of this invention is to provide light and heat resistant rubber hydrochloride compositions suitable for use in the preparation of sheets, filaments, solutions, coating compositions, molded articles and the like. Still another object of the invention is to provide articles prepared from rubber hydrochloride compositions containing polymeric basic amino-nitrogen-containing bodies. A specific object of the invention is to provide a sheet of rubber hydrochloride containing a phenol-formaldehyde-methylamine resin. Other objects of the invention will become apparent from the following description of the invention.

These objects are accomplished in general by incorporating a polymeric basic amino-nitrogen-containing body in any suitable manner, with a rubber hydrohalide preferably rubber hydrochloride containing 26 to 34% chlorine.

The following tables illustrate the effect of the novel stabilizers of the present invention on rubber hydrochloride compositions, the tables including a comparison with unmodified rubber hydrochloride.

Table I gives the times of exposure to ultra-violet light from a mercury arc lamp at a distance of about 18 inches, and to heat treatment at 65° C. in the dark, during which sheets of rubber hydrochloride approximately 0.001 inch thick and containing various modifying agents retain, in large measure, their flexibility and good film properties.

Table I

| | Modifying agent | Percent concentration based on rubber hydrochloride | Hours exposure to ultra-violet light | Days exposure at 65° C. |
|---|---|---|---|---|
| a | Phenol - formaldehyde - methylamine resin | 10 | More than 48 | 20 |
| b | Polymeric beta-dibutylaminoethyl alpha-methacrylate | 10 | 40 | 40 |
| c | Polymeric beta-dicyclohexylaminoethyl alpha-methacrylate | 10 | 20 | 10 |
| d | Interpolymer of beta-dicyclohexylaminoethyl alpha-methacrylate (70%) with beta-dimethylaminoethyl alpha-methacrylate (30%) | 10 | 20 | 35 |
| e | Aniline-acetylene resin | 10 | 30 | 25 |

Table II records the times of exposure to ultra-violet light from a mercury arc lamp at a distance of about 18 inches, required for the development of a slight discoloration of copper strips coated with rubber hydrochloride films containing polymeric basic amino-nitrogen-containing materials.

Table II

| | Modifying agent | Percent concentration based on rubber hydrochloride | Hours exposure to ultra-violet light |
|---|---|---|---|
| a | None | | 3 |
| b | Polymeric beta-dicyclohexylaminoethyl alpha-methacrylate | 5 | More than 25 |
| c | Polymeric beta-diethylaminoethyl alpha-methacrylate | 20 | More than 25 |
| d | Phenol - formaldehyde - dimethylamine resin | 10 | More than 25 |
| e | Phenol - dimethylaminomethanol - formaldehyde resin | 20 | More than 25 |

Table III gives the times of exposure to room temperature conditions and sunlight from a skylight during which sheets of rubber hydrochloride, approximately 0.001 inch thick and containing various polymeric basic amino-nitrogen-containing materials, retain in large measure their flexibility and good film properties.

*Table III*

| | Modifying agent | Percent concentration based on rubber hydrochloride | Weeks exposure |
|---|---|---|---|
| a | None | | Less than 8 |
| b | Interpolymer of beta-dicyclohexylaminoethyl alpha-methacrylate and beta-dimethylaminoethyl alpha-methacrylate | 10 | 15 |
| c | Phenol - aniline - formaldehyde - ammonia resin | 1 | 20 |
| d | Diphenyl guanidine-formaldehyde resin | 10 | 18 |
| e | Diphenyl guanidine - formaldehyde-methylamine resin | 10 | 15 |

In the above tables, the phenol-formaldehyde-methylamine resin (Table I*a*) is a resin prepared by the condensation of one mol of phenol, 2 mols of formeldehyde, and one mol of methylamine in the manner described in U. S. Patent 2,098,869. The polymeric amino-alcohol esters of alpha-methacrylic acid (Tables I*b*, I*c*, I*d*, II*b*, II*c* and III*b*) are prepared in the manner described in U. S. Patent 2,138,762, and in Br. Patent 475,131. The interpolymer of beta-dicyclohexylaminoethyl alpha-methacrylate and beta-dimethylaminoethyl alpha-methacrylate, referred to above, is an interpolymer of 70 parts of beta-dicyclohexylaminoethyl alpha-methacrylate with 30 parts of beta-dimethylaminoethyl alpha-methacrylate. The aniline-acetylene resin (Table I*e*) is prepared by the condensation of aniline with acetylene in the presence of acid according to the method disclosed in Swiss Patent No. 129,592. It should be mentioned that this resin is rather dark in color and rubber hydrochloride compositions containing it are also somewhat colored.

The phenol-formaldehyde-dimethylamine resin (Table II*d*) is prepared by the condensation of one mol of phenol with 1.9 mols of formaldehyde and 0.5 mol of dimethylamine. The phenol-formaldehyde-dimethylaminomethanol resin (Table II*e*) is prepared by the condensation of one mol of phenol with 1.4 mols of formaldehyde and one mol of dimethylaminomethanol. The phenol-aniline-ammonia-formaldehyde resin (Table III*c*) is prepared by the condensation of one mol of phenol, 0.2 mol of aniline, one mol of ammonia and 1.8 mols of formaldehyde. The diphenylguanidine-formaldehyde resin (Table III*d*) is prepared by the condensation of equimolar amounts of diphenylguanidine and formaldehyde. The diphenylguanidine-methylamine-formaldehyde resin (Table III*e*) is prepared by the condensation of one mol of diphenylguanidine, one mol of methylamine and 2 mols of formaldehyde. The conditions used in the preparation of these five polymeric basic amino-nitrogen-containing materials are similar to those used for the phenol-formaldehyde-methylamine resin (Table I*a*) described above.

The following detailed examples are given for the purpose of more specifically describing various procedures which may be followed in applying the principles of the invention.

*Example A*

Rubber hydrochloride, prepared by the addition of dry hydrogen chloride to a 4% solution of 30-minute milled pale crepe rubber in chloroform, precipitation of the product by methanol being followed by a methanol wash, and containing about 30.5% chlorine, was dissolved in chloroform to a 5% solution. To this solution was added 10% based on the weight of the rubber hydrochloride of a phenol-formaldehyde-methylamine resin prepared by the condensation of 1.0 mol of phenol, 2.0 mols of formaldehyde and 1.0 mol of methylamine under the conditions described in Harmon and Meigs U. S. Patent 2,098,869. Films were cast from the clear solution on a chromium plated steel plate and dried at about 40° C., after which they were stripped from the plate. These films, approximately 0.001 inch thick, were flexible, transparent, and strong. The films were exposed to the action of ultra-violet light at a distance of about 18 inches for the various periods of time after which the flexibilities of samples were determined on the Pfund Flexor. The results (number of bends) are given in the following table with, in addition, the behavior under identical conditions of unmodified rubber hydrochloride and rubber hydrochloride containing a monomeric amine.

| Modifying agent | Flexibility after exposure to ultra-violet light | | | |
|---|---|---|---|---|
| | 0 hours | 2 hours | 24 hours | 48 hours |
| None | >500 | 155 | 1 | No test |
| Phenol-formaldehyde methylamine resin | >500 | >500 | >500 | >500 |
| Dicyclohexylamine (10%) | >500 | >500 | 2 | No test |

Strips of film were also heated at 65° C. for various periods of time in the dark. The results follow:

| Modifying agent | Flexibility at 65° C. | | |
|---|---|---|---|
| | 2 days | 15 days | 30 days |
| None | >500 | 1 | 1 |
| Phenol-formaldehyde-methylamine | >500 | 103 | 1 |
| Dicyclohexylamine (10%) | >500 | 1 | 1 |

In addition small copper strips were coated with thin films of the composition. These strips, after drying and with suitable controls, were exposed to ultra-violet light for various lengths of time. The changes in color of the coated strips are given in the following table.

| Modifying agent | Appearance after ultra-violet exposure | | | |
|---|---|---|---|---|
| | 1 hour | 2 hours | 7 hours | 28 hours |
| None | Dark | Very dark | Very dark | Very dark. |
| Phenol-formaldehyde-methylamine | Very sl. yellow | No change | No change | No change. |
| Dicyclohexylamine (10%) | No change | ---do------ | Sl. dark | Dark. |

*Example B*

To a 5% solution in chloroform of rubber hydrochloride was added 10%, based on the weight of the rubber hydrochloride, of stearate of phenol-formaldehyde-methylamine resin, which dissolves readily in the solution. The phenol-formaldehyde-methylamine resin stearate was prepared by melting one mol of stearic acid with the resin prepared by the condensation (as described in U. S. Patent 2,098,869) of one mol of phenol, two mols of formaldehyde, and one mol of methylamine.

This modified rubber hydrochloride composition is suitable for the preparation of coatings and self-supporting films which retain their flexibility, tensile strength and toughness much longer than similar coatings and films prepared from unmodified rubber hydrochloride. Thus, transparent, self-supporting films approximately 0.001 inch thick were prepared from the above composition by solvent evaporation. These films retained in large measure their flexibility, tensile strength and toughness for 30 weeks aging under room conditions and exposure to sunlight from a skylight. Similar films prepared from unmodified rubber hydrochloride were weak and brittle after 8 weeks exposure under the same conditions. When exposed to a temperature of 65° C. in a dark oven, the films containing the amine resin stearate retained their excellent properties in large measure for 20 days whereas films of unmodified rubber hydrochloride failed after 5 days exposure at the same temperature.

*Example C*

To a 5% solution in chloroform of rubber hydrochloride was added 1%, based on the weight of the rubber hydrochloride, of the stearate of polymeric beta-diethylaminoethyl alpha-methacrylate which dissolves readily in the solution. The amine salt is prepared by dissolving one mol of stearic acid and one mol (185 parts) of polymeric beta-diethylaminoethyl alpha-methacrylate (prepared according to Example II of Harmon, U. S. Patent 2,138,762) in a solvent mixture comprising 90% ethanol and 10% water, and then evaporating the solvents.

This modified rubber hydrochloride composition is suitable for the preparation of films and coatings which are resistant to deterioration with age. Thus, transparent, self-supporting films approximately 0.001 inch thick were prepared from the above composition by solvent evaporation. These films retained in large measure their flexibility, tensile strength and toughness for 15 weeks aging under room conditions and exposure to sunlight from a skylight. Similar films of unmodified rubber hydrochloride became quite brittle after 8 weeks exposure under the same conditions.

If desired, higher concentrations of the amine resin stearate may be used. Self-supporting films were prepared from a rubber hydrochloride composition similar to the above but containing 10% of the polymeric beta-diethylaminoethyl methacrylate stearate, and were aged at 65° C. in a dark oven. These films retained good film properties during 25 days aging at 65° C., whereas similar films from unmodified rubber hydrochloride failed in 5 days at the same temperature.

*Example D*

Transparent films were prepared from a composition similar to that of Example A but containing only 5% based on the weight of rubber hydrochloride of the amine resin stearate. These films were exposed in a standard Fadeometer and retained their flexibility, tensile strength and toughness in large measure, after 150 hours exposure. Similar films of unmodified rubber hydrochloride were weak and brittle after 40 hours exposure in the Fadeometer.

Examples B, C and D illustrate the use of polymeric amine salts. These salts, and particularly those salts of fatty acids having ten or more carbon atoms, are preferable in some respects to the polymeric amines themselves because of a better solubility in chloroform, toluene, benzene and other rubber hydrochloride solvents, and additionally, because they are frequently more compatible with rubber hydrochlorides than are the polymeric amines themselves. Hence, when it is desirable to use a very large quantity of the polymeric amine in the rubber hydrochloride, for example, a quantity outside compatibility limits, one would first convert the polymeric amine to a compatible salt such as a stearate. Also, the hydrogen ion concentration of the rubber hydrochloride may be maintained nearer the neutral point by the use of long chain fatty acid salts of the polymeric amine. These salts are still capable of reacting with hydrogen chloride which may be given off by the rubber hydrochloride, the hydrogen chloride displacing the much weaker stearic acid, this latter acid being water insoluble and remaining in the film, but due to its very weak character having substantially no effect on the pH of the film.

Among the polymeric basic amino-nitrogen-containing materials which may be used in the practice of this invention, may be mentioned the amino-nitrogen-containing resins prepared by reacting a phenol containing carbon, hydrogen, and oxygen only and having at least three unsubstituted positions in the nucleus, at least two of which are ortho or para to phenolic hydroxyl, particularly those phenols conforming to the type:

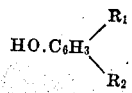

where $R_1$ and $R_2$ are hydrogen, hydroxyl, methylol, or alkyl containing less than three carbon atoms, with an aldehyde (particularly formaldehyde) and a non-aromatic amine containing less than seven carbon atoms, the molecular ratio of amine to phenol being not less than 0.5:1 and not greater than 1:1, and the molecular ratio of aldehyde to amine being greater than 1:1. Certain of the resins within this class are disclosed in U. S. Patent 2,098,869.

There may also be employed the polymeric amino alcohol ester of acrylic and substituted acrylic acids, for example those described in U. S. Patent 2,138,762, and in Graves Br. Patent 475,131. Likewise, the resinous products prepared by the condensation of diphenyl- or other diarylguanidines with formaldehyde or with formaldehyde and primary or secondary amines may be employed in the practice of this invention.

While these classes of materials constitute the preferred types of polymeric basic amino-nitrogen-containing materials, suitable for the purposes of this invention, other polymeric amino-nitrogen-containing materials may be employed among which may be mentioned the resinous products prepared by treating polyvinyl chloracetate with secondary aliphatic amines; resins prepared by reacting aliphatic or alicyclic ketones with formaldehyde and primary or secondary aliphatic amines; resins prepared by reacting urea and formaldehyde with primary or secondary aliphatic amines particularly dibutyl amines; reaction products of epichlorohydrin with ammonia or primary aliphatic amines, which reaction products have been polymerized in the presence of catalytic proportions of stannic chloride; the reaction product of phenol-lignin with dimethylamine and formaldehyde; reaction products of vinyl ketone polymers with ammonia or primary amines, for example, those described in Balthis U. S. Patent 2,122,707; the products obtained by catalytically hydrogenating resins having ketone groups at super-atmospheric temperature and pressure and in the presense of ammonia or primary or secondary amines, such as those described in Greenewalt U. S. Patent 2,063,158; certain amino-proteins which are reaction products of proteins with carbonyl compounds, such as lower aliphatic aldehydes and ketones, and amines having less than nine carbon atoms in which the amino-nitrogen is joined to the aliphatic carbon, for example, those disclosed in Meigs U. S. Patent 2,143,023; and the reaction products of triethanolamines with phthalic esters, singly or in combination.

Additional examples of specific polymeric amino-nitrogen-containing substances, which function in this invention are 2-aminocyclohexyl alpha-methacrylate polymer, 2-(diethylamino)-cyclohexyl methacrylate polymer, beta-diethylaminoethyl acrylate polymer, beta-dicyclohexylamino-ethyl acrylate polymer, the resin obtained by the hydrogenation in the presence of ammonia of polymerized bis-(4-keto cyclohexyl) dimethylmethane, the resin resulting from the hydrogenation in the presence of ammonia of (methylene-cyclohexanone) polymer, the resin obtained from the hydrogenation in the presence of ammonia of polymerized methyl vinyl ketone, the reaction product of polymeric methyl alpha-methylvinyl ketone and cyclohexylamine, the reaction product of polyvinyl chloracetate and dibutylamine, the reaction product of polyvinyl chloracetate and dicyclohexylamine, dibutylaminomethylzein, cyclohexylethylaminomethylzein, and the like.

In the practice of this invention, the amount of polymeric basic amino-nitrogen-containing material which may be used may be from 0.2 to 30% or more of the weight of the rubber hydrochloride. The preferred quantity is from 0.5 to 20% of the weight of the rubber hydrochloride and usually from 2 to 10%. The polymeric basic amino-nitrogen-containing materials may be used singly or in combination.

In the preparation of transparent films and coatings, from rubber hydrochloride compositions, containing polymeric basic amino-nitrogen-containing substances, it is preferred that the polymeric basic amine-nitrogen-containing substance be compatible with the rubber hydrochloride or be used in an amount which is compatible with the rubber hydrochloride, and be soluble in solvents for rubber hydrochloride, such as chloroform, carbon tetrachloride, benzene, toluene, methylene chloride and the like. When transparency is not essential, it is not necessary that the polymeric basic amino-nitrogen-containing body be completely compatible with the rubber hydrochloride or that it be used in an amount which is compatible with the rubber hydrochloride.

The polymeric basic amino-nitrogen-containing substance may be introduced into the rubber hydrochloride composition in any suitable manner, for example, by the use of a mutual solvent, by milling, grinding or kneading the rubber hydrochloride with the polymeric basic amino-nitrogen-containing material, or the like.

The rubber hydrochloride which is used in the practice of this invention may be prepared by any of the methods known to the art, for example by the addition of gaseous hydrogen chloride to rubber dissolved in a chlorinated solvent, by the treatment of rubber with solutions of substantially anhydrous hydrogen chloride in a non-solvent for rubber such as ethyl acetate, by the reaction of rubber with liquid substantially anhydrous hydrogen chloride at low temperatures such as —80° C., or the like. The rubber hydrochloride may contain 26 to 34% combined chlorine and preferably 28 to 32%. It may be of the amorphous or crystalline varieties or mixtures may be used. In the preparation of the compositions which are an object of this invention it is preferable to use a neutral rubber hydrochloride from which any free hydrogen chloride has been removed, for example, by washing with methanol, by treatment of the rubber hydrochloride, which may be in solution, with alkali or alkaline earth carbonates, hydroxides or oxides, with organic amines or other basic materials followed by removal of the basic material and its salts, or by any other suitable method.

One method for preparing rubber hydrochloride to be used in the practice of the present invention is as follows:

*Example E*

A 3% solution in chloroform of 30-minute milled pale crepe rubber was saturated at room temperature with dry hydrogen chloride. Additional hydrogen chloride was then passed into the solution with stirring for 48 hours. The resulting solution was poured slowly into a large excess of methanol, whereby the rubber hydrochloride was precipitated. The product was washed with methanol until the washings were neutral to bromthymol blue, after which it was redissolved to a 5% solution in chloroform. The chlorine content of this rubber hydrochloride was found to be 30.5 to 31.5%.

Rubber hydrochloride compositions containing polymeric basic amino-nitrogen-containing materials may be dissolved in solvents in any manner known to the art and may be used in the preparation of transparent sheeting for wrapping purposes, protective coatings and the like. The compositions may be milled for the purpose of reducing the viscosity of the composition in order to obtain a high solids coating composition. In addition, these rubber hydrochloride compositions may be rolled and calendered into sheets and molded under heat and pressure into articles of commerce. The compositions may be used for lamination to by heat and pressure or with adhesives, and for the coating of paper, sheets of regenerated cellulose, transparent sheets and films of all kinds, synthetic or natural filaments and fibers, textiles, wood, metal, stone, ceramic materials, glass, and the like, and may be used as adhesives.

These new compositions may also contain, in addition to rubber hydrochloride and the polymeric basic amino-nitrogen-containing body, any of the modifying agents known to the art, for example solvents, synthetic or naturally occurring resins, waxes, wax substitutes or wax-like materials, wax-blending agents, oils and drying oils, driers, fats, antistatic agents, slip agents, pigments, metallic powders, fillers, dyes, plasticizers, other film-forming materials, stabilizers, and the like, singly or in combination.

These new compositions of rubber hydrochloride with polymeric basic amino-nitrogen-containing materials have a number of advantages over the compositions previously known to the art. They resist the action of both heat and light and in many cases, as shown in the examples above, are considerably more resistant to the deteriorating action of light and heat than the compositions previously known to the art. Because polymeric basic amino-nitrogen-containing materials are non-volatile, they do not evaporate from the compositions in which they are used and these compositions retain their resistance to light and heat over long periods of time. Non-volatile heat resisting agents have been described in the prior art but these materials, for example magnesium oxide, are insoluble in organic solvents and incompatible with rubber hydrochloride and, hence, cannot be used for the preparation of glass clear, transparent compositions. By the practice of the present invention, compositions of glass clear transparency can readily be prepared because of the excellent solubility and compatibility of polymeric basic amino-nitrogen-containing materials. The compatible agents disclosed in the prior art are relatively volatile and for this reason are not as effective against the deteriorating action of heat as the non-volatile polymeric basic amino-nitrogen-containing materials. Polymeric basic amino-nitrogen-containing materials which are used in the practice of this invention are also advantageous because they are, of themselves, film-forming agents and their use in rubber hydrochloride compositions causes no substantial change or loss of the film-forming properties of rubber hydrochloride, whereas most of the materials disclosed in prior art are liquid and tend to affect the film properties of the rubber hydrochloride compositions in which they are used. In addition, because they cause no substantial change in the film-forming properties, polymeric basic amino-nitrogen-containing substances may be used in larger amounts than the materials previously disclosed, if this is desirable for the specific purpose to which the composition is to be put.

Any variation or modification of the invention which conforms to its spirit is intended to be included within the scope of the claims; for example, while the invention in its preferred form applies to the stabilization of rubber hydrochloride, other rubber hydrohalides, for example, rubber hydrobromide may be treated in like manner to obtain similar results.

We claim:

1. Rubber hydrochloride of about 30.5% chlorine content self-sustaining film containing 10% based on the weight of rubber hydrochloride of a phenol formaldehyde-methylamine resin prepared by the condensation of 1.0 mol of phenol, 2.0 mols of formaldehyde and 1.0 mol of methylamine.

2. Rubber hydrohalide of about 26% to 34% halogen content self-sustaining film containing 10% based on the weight of rubber hydrohalide of a phenol-formaldehyde-methylamine resin prepared by the condensation of 1.0 mol of phenol, 2.0 mols of formaldehyde and 1.0 mol of methylamine.

3. Rubber hydrochloride of 26% to 34% chlorine content self-sustaining film containing 10% based on the weight of rubber hydrochloride of a phenol-formaldehyde-methylamine resin prepared by the condensation of 1.0 mol of phenol, 2.0 mols of formaldehyde and 1.0 mol of methylamine.

4. A composition of matter comprising a rubber hydrohalide and phenol-formaldehyde-methylamine resin.

5. A composition of matter comprising essentially rubber hydrochloride and a resinous phenol-formaldehyde-methylamine material.

6. An article comprising a rubber hydrohalide of 26% to 34% halogen content containing, as an agent for increasing its resistance to deterioration by heat and light, phenol-formaldehyde-methylamine resin.

7. An article comprising a rubber hydrochloride of 26% to 34% chlorine content containing, as an agent for increasing its resistance to deterioration by heat and light, resinous phenol-formaldehyde-methylamine material.

ELLSWORTH K. ELLINGBOE.
PAUL L. SALZBERG.